United States Patent [19]

Endo et al.

[11] Patent Number: 5,005,897
[45] Date of Patent: Apr. 9, 1991

[54] WIPER DEVICE OF A MOTOR VEHICLE

[75] Inventors: Misao Endo, Chiyoda; Shigemi Kambayashi, Nitta, both of Japan

[73] Assignee: Fuji Jukogyo Kabushiki Kaisha, Tokyo, Japan

[21] Appl. No.: 494,015

[22] Filed: Mar. 15, 1990

[30] Foreign Application Priority Data

Apr. 19, 1989 [JP] Japan .................. 1-46139[U]

[51] Int. Cl.$^5$ .................. B62D 25/08
[52] U.S. Cl. .................. 296/192; 296/194; 15/250.19
[58] Field of Search .................. 296/192, 194; 15/250.19, 250.16, 250.17

[56] References Cited

U.S. PATENT DOCUMENTS 3,843,194 10/1974 Yamada .................. 296/192
4,718,712 1/1988 Nakatani .................. 296/192
4,770,462 9/1988 Kuraoka et al. .................. 296/192
4,874,199 10/1989 Yamamoto .................. 296/192

FOREIGN PATENT DOCUMENTS 62-130983 8/1987 Japan .
62-37815 9/1987 Japan .
265776 11/1988 Japan .

Primary Examiner—Robert R. Song
Attorney, Agent, or Firm—Martin A. Farber

[57] ABSTRACT

A wiper device of a motor vehicle has a cowl provided adjacent a front edge of a windshield, and a bulkhead in a form of a box laterally extending under the cowl. The space in the bulkhead is divided into a wiper housing at a front side and an air duct at a rear side by a front panel. A wiper linkage is provided in the bulkhead under the cowl, extending through an opening formed in the front panel.

2 Claims, 3 Drawing Sheets

WIPER DEVICE OF A MOTOR VEHICLE

BACKGROUND OF THE INVENTION

The present invention relates to a wiper device provided in a bulkhead of a motor vehicle between an engine space and interior space.

Japanese Utility Model Application Publication No. 62-37815 and Japanese Utility Model Application Laid-Open No. 62-130983 disclose the wiper device which are disposed inside a bulkhead formed as a box.

In order to improve aerodynamic characteristics of the vehicle, a windshield is considerably rearwardly raked and hence a front edge of the windshield is located at a forward position. In such a body, the space in the bulkhead becomes small, because the front edge of the windshield is located near strut houses of a front suspension system. Consequently, it is difficult to provide the wiper device in the bulkhead, as described below.

In a typical wiper device, a wiper motor is provided in the bulkhead at the passenger side of the front seat of the vehicle, and a side wiper link is located in a side of the vehicle body at the driver's seat. The wiper link forwardly protrudes from a pivot thereof. Therefore, the front end of the wiper link touches the bulkhead. In order to avoid this contact, the strut houses and the bulkhead must be formed into complicated shapes. This decreases productivity and hence increases manufacturing cost

SUMMARY OF THE INVENTION

The object of the present invention is to provide a wiper device of a motor vehicle which enables a large backward rake of the windshield with a simple construction.

According to the present invention, there is provided a wiper device of a motor vehicle having a cowl provided adjacent a front edge of a windshield and a bulkhead in a form of a box laterally extending under the cowl, comprising a front panel vertically provided in the bulkhead to divide space in the bulkhead into a wiper housing at a front side and an air duct at a rear side, a center pivot mounted on the cowl at a central position with respect to a lateral direction of the vehicle, a side pivot mounted on the cowl at a side position of the vehicle, a wiper motor provided in the bulkhead at an opposite side to the side pivot, a center wiper link pivotally mounted on the center pivot at a center thereof, a side wiper link pivotally mounted on the side pivot at a front end thereof, a first wiper rod connected between the wiper motor and a front end of the center wiper link, and a second wiper rod connected between a rear end of the center wiper link and a rear end of the side wiper link, the front panel having an opening through which the second wiper rod extends and fresh air passes for ventilation.

In an aspect of the invention a front wall of the bulkhead is inclined so as to avoid interference with strut houses of the vehicle.

The other objects and features of this invention will become understood from the following description with reference to the accompanying drawings.

BRIEF DESCRIPTION OF THE PREFERRED EMBODIMENT

DETAILED DESCRIPTION OF THE PREFERRED EMBODIMENTS

Figure 2:
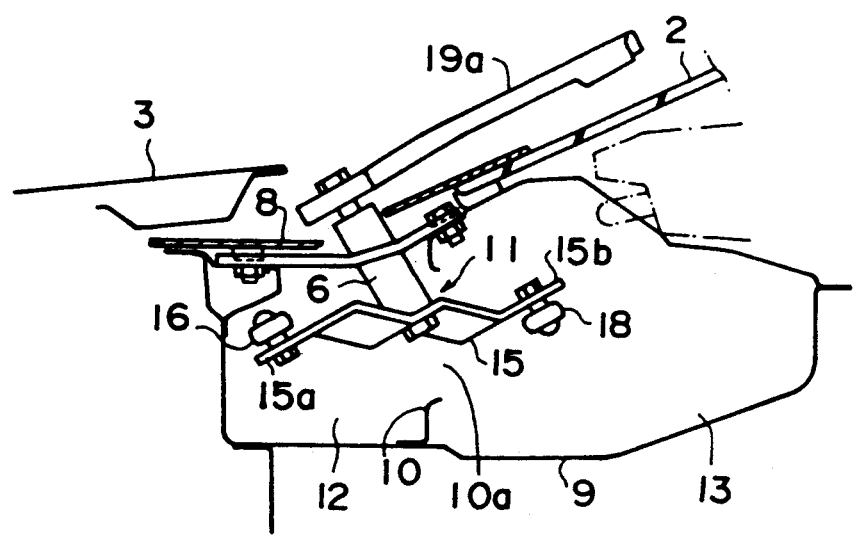
FIG. 2 is a sectional view of the vehicle taken along a line II—II of FIG. 1.

Referring to the figures, a vehicle body 1 of a motor vehicle having a driver's seat on a left side has a windshield 2 and an engine hood panel 3. On both sides of the body 1, strut houses 4 and 5 respectively housing struts 4a and 5a of a front suspension system are formed. As shown in FIG. 2, a cowl 8 extends from the underside of the engine hood panel 3 to a front edge of the windshield 2.

A bulkhead 9 in a form of a box is laterally provided under the cowl 8, extending between both sides of the vehicle. A front wall 9a of the bulkhead 9 is inclined to the rear at right and left sides as shown in FIG. 3, to prevent side portions thereof from interfering with the strut houses 4 and 5.

The bulkhead 9 is divided into a wiper housing 12 for a wiper linkage 11 and an air duct 13 by a front panel 10.

Figure 1:
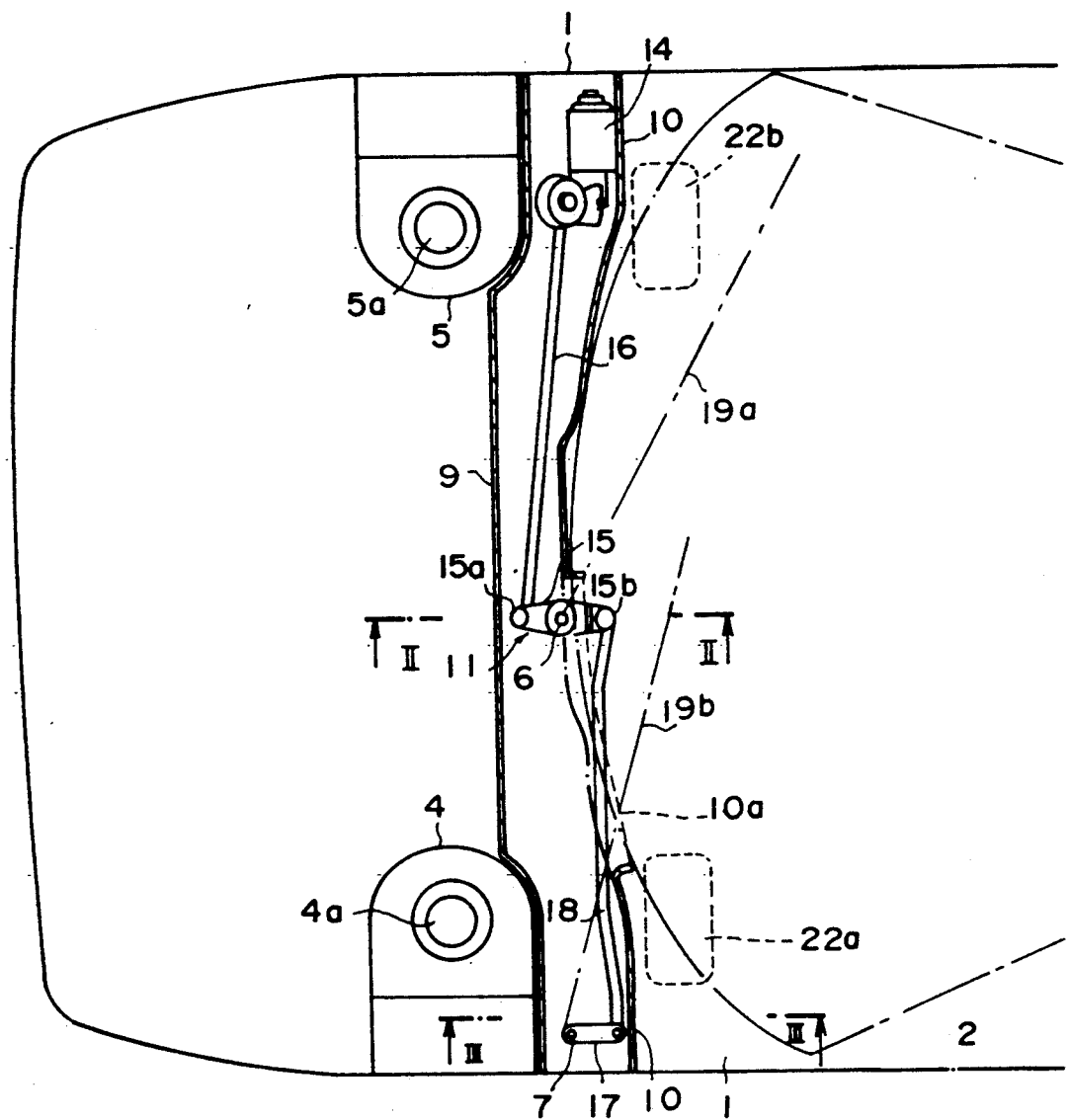
FIG. 1 is a schematic plan view of a front part of a motor vehicle having a driver's seat on a left side thereof.

A wiper motor 14 is provided in the wiper housing 12 at the right side of the vehicle, that is the passenger side. The motor 14 is connected with a right wiper rod 16 of the wiper linkage 11, which in turn is connected with a front end 15a of a center wiper link 15 pivotally mounted on a center pivot 6 at a center thereof. The wiper pivot 6 inclined toward the rear is mounted on the cowl 8 at a center of the vehicle (FIG. 2). A rear end 15b of the link 15 is connected to a left wiper rod 18 which is connected to a rear end of a side wiper link 17. A front end of the side wiper link 17 is mounted on the cowl 8 through a side pivot 7 which is provided at the left side of the vehicle and slants to the rear (FIG. 3). The wiper linkage 11 is thus assembled so that the rear end of the side wiper link 17 swings about the pivot 7 when the left wiper rod 18 laterally reciprocates. As shown in FIGS. 1 and 2, an opening 10a is formed in the front panel 10 through which the center link 15 and the left wiper rod 18 extends, so that the reciprocating movement of the rod 18 may be performed.

Figure 3:
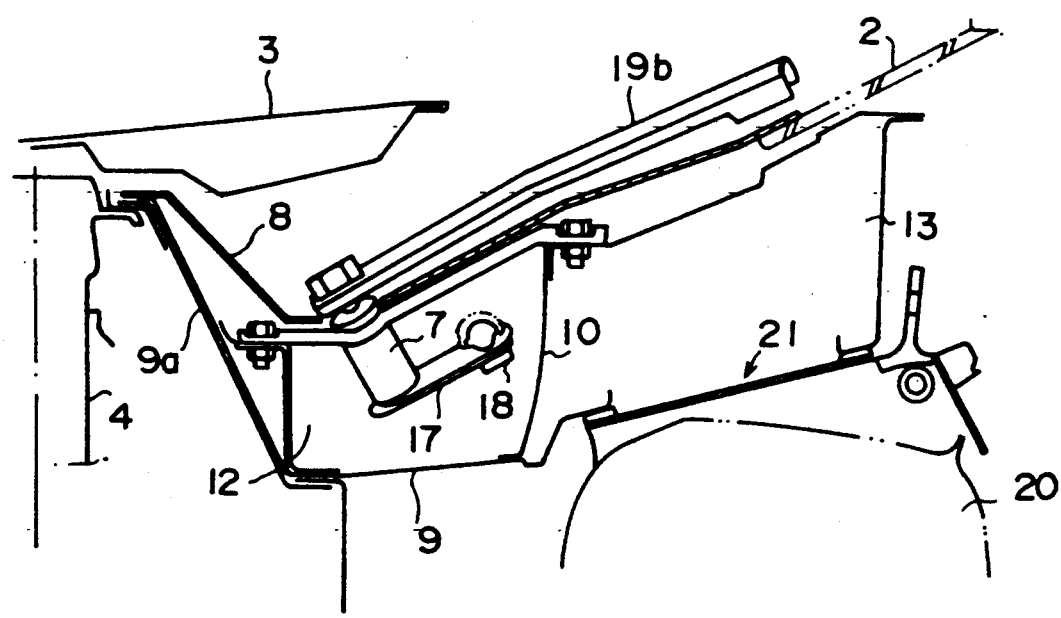
FIG. 3 is a sectional view of the vehicle taken along a line III—III of FIG. 1.

As shown in FIGS. 2 and 3, wiper arms 19a and 19b are respectively mounted on the pivot 6 of the center wiper link 15 and the pivot 7 of the side wiper link 17.

Air enters the wiper housing 12 of the bulkhead 9 through slits (not shown) formed in the cowl 8, and the air duct 13 through the opening 10a. A small amount of the air flows into the interior space of the vehicle through a pair of air vents 22a and 22b provided at both sides of the vehicle (FIG. 1). The air also flows into an air conditioner 20 provided under the bulkhead 9 through an air inlet 21 formed at an appropriate position of the air duct 13.

Therefore, the front wall 9a of the bulkhead 9 disposed under the engine hood panel 3 and the windshield 2 are shaped so as not to interfere with the strut houses 4 and 5 provided on both sides of the body 1. In addition, since the wiper rod 18 is connected to the rear ends of both wiper links 15 and 17, sufficient space is provided between the struct houses 4 and 5 and the bulkhead 9, thereby enabling the wiper linkage 11 to be disposed without interfering with the front wall 9a of the bulkhead 9. Thus the windshield 2 can be sufficiently slanted to provide a vehicle body with an improved aerodynamic characteristics.

Since the opening 10a through which the wiper rod 18 extends serves as an air passage, an independent air duct need not be provided. Consequently, the structure of the body is simplified resulting in a decrease in manufacturing cost.

The present invention may be adapted to a vehicle having a driver's seat on the right side of the vehicle, provided the whole structure is symmetrically reversed with respect to the lateral center line of the vehicle.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A wiper device of a motor vehicle having a cowl provided adjacent a front edge of a windshield and a bulkhead in a form of a box laterally extending under the cowl, comprising:

a front panel vertically provided in the bulkhead to form a chamber in the bulkhead into a housing for a wiper at a front side and an air duct at a rear side;

a center pivot mounted on the cowl on a lateral center line of the vehicle;

a side pivot mounted on the cowl at a side position of the vehicle;

a wiper motor provided in the bulkhead at an opposite side of the side pivot;

a center wiper link pivotally mounted on the center pivot at a center thereof;

a side wiper link pivotally mounted on the side pivot at a front end thereof;

a first wiper rod connected between the wiper motor and a front end of the center wiper link;

a second wiper rod connected between a rear end of the center wiper link and a rear end of the side wiper link; and the front panel having an opening through which the second wiper rod extends and fresh air passes for ventilation.

2. The wiper device according to claim 1, wherein a front wall of the bulkhead is inclined so as to avoid interference with a strut house of the vehicle.

* * * * *